(12) United States Patent
Krstic et al.

(10) Patent No.: US 12,074,849 B2
(45) Date of Patent: Aug. 27, 2024

(54) APPLICATION SPECIFIC NETWORK DATA FILTERING

(71) Applicant: Apple Inc., Cupertino, CA (US)

(72) Inventors: Ivan Krstic, San Francisco, CA (US); Damien P. Sorresso, San Francisco, CA (US); David P Remahl, Woodside, CA (US); Elliot C. Liskin, San Jose, CA (US); Justin S. Hogg, San Francisco, CA (US); Kevin J. Lindeman, Morgan Hill, CA (US); Lucia E. Ballard, San Francisco, CA (US); Nicholas J. Circosta, Mountain View, CA (US); Richard J. Cooper, Bedford (GB); Ryan A. Williams, Sunnyvale, CA (US); Steven C. Vittitoe, Valparaiso, IN (US); Zachariah J. Riggle, Cupertino, CA (US); Patrick R. Metcalfe, Santa Clara, CA (US); Andrew T. Whitehead, Frisco, TX (US)

(73) Assignee: Apple Inc., Cupertino, CA (US)

(*) Notice: Subject to any disclaimer, the term of this patent is extended or adjusted under 35 U.S.C. 154(b) by 316 days.

(21) Appl. No.: 17/353,690

(22) Filed: Jun. 21, 2021

(65) Prior Publication Data

US 2021/0400019 A1    Dec. 23, 2021

Related U.S. Application Data

(60) Provisional application No. 63/042,002, filed on Jun. 21, 2020.

(51) Int. Cl.
*H04L 29/06* (2006.01)
*H04L 9/40* (2022.01)
*H04L 51/212* (2022.01)

(52) U.S. Cl.
CPC ........ *H04L 63/0245* (2013.01); *H04L 51/212* (2022.05)

(58) Field of Classification Search
CPC . H04L 63/0245; H04L 51/212; H04L 63/123; G06F 21/53; G06F 21/56; G06F 21/566
See application file for complete search history.

(56) References Cited

U.S. PATENT DOCUMENTS

| 8,850,572 B2 | 9/2014 | Paterson |
| 9,904,781 B2 * | 2/2018 | Martini .................. H04L 63/14 |

(Continued)

FOREIGN PATENT DOCUMENTS

JP    2017-228153    12/2017

OTHER PUBLICATIONS

Invitation to Pay Additional Fees from PCT/US2021/038259, dated Sep. 13, 2021, 14 pages.

(Continued)

*Primary Examiner* — Yogesh Paliwal
(74) *Attorney, Agent, or Firm* — BAKERHOSTETLER

(57) ABSTRACT

The subject disclosure provides systems and methods for application-specific network data filtering. Application-specific network data filtering may be performed by a sandboxed process prior to providing the network data to an application to which the network data is directed. Any malicious or otherwise potentially harmful data that is included in the network data may be removed by the application-specific network data filter or may be allowed to corrupt the application specific network data filtering operations within the sandbox, thereby preventing the malicious or harmful data from affecting the application or other portions of an electronic device. In one or more implementations, a first process such as an application-specific network data filtering process may request allocation of (Continued)

memory for the first process from second process, such as an application, that is separate from a memory manager of the electronic device.

41 Claims, 11 Drawing Sheets

(56) References Cited

U.S. PATENT DOCUMENTS

| | | | | |
|---|---|---|---|---|
| 10,581,874 | B1* | 3/2020 | Khalid | H04L 63/1425 |
| 2012/0311702 | A1* | 12/2012 | Krstic | G06F 21/53 |
| | | | | 726/22 |
| 2015/0106947 | A1* | 4/2015 | Holman | G06F 21/6245 |
| | | | | 726/26 |
| 2018/0285564 | A1* | 10/2018 | Qu | G06F 21/566 |

OTHER PUBLICATIONS

International Search Report and Written Opinion from PCT/US2021/038259, dated Nov. 4, 2021, 20 pages.
Esposito, "Apple adopts now 'BlastDoor' security system on iOS 14 to reinforce iMessage integrity," Jan. 2021, retrieved from https://9to5mac.com/2021/01/28/apple-adopts-new-blastdoor-security-system-on-ios-14-to-reinforce-imessage-integrity/, 5 pages.
European Office Action from European Patent Application No. 21743333.3, dated Sep. 11, 2023, 7 pages.

* cited by examiner

APPLICATION SPECIFIC NETWORK DATA FILTERING

CROSS REFERENCE TO RELATED APPLICATIONS

This application claims the benefit of priority to U.S. Provisional Patent Application No. 63/042,002, entitled "Application Specific Network Data Filtering," filed on Jun. 21, 2020, the disclosure of which is hereby incorporated herein in its entirety.

TECHNICAL FIELD

The present description relates generally to receiving and processing network data and, more particularly, to application specific network data filtering.

BACKGROUND

Messages such as text messages are often received and processed by a messaging application at a device, for display of the messages to a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
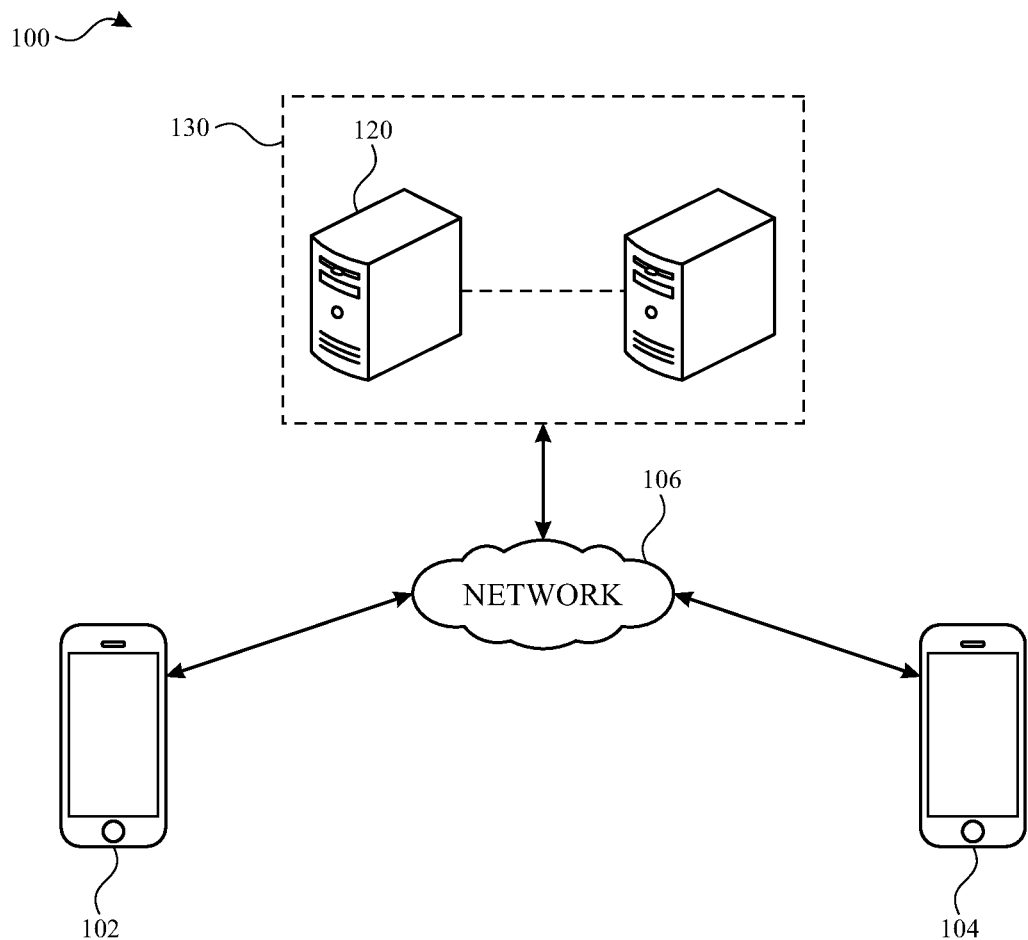
FIG. 1 illustrates an example network environment for electronic messaging in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as personal computers (e.g., desktop computers and laptop computers), portable electronic devices (e.g., tablet computers and smartphones) and wearable devices (e.g., smartwatches, etc.) often include applications that receive and process application-specific network data from another device or a server over a network. For example, a device may include a messaging application that receives and processes electronic messages (e.g., including text, images, video content, audio content, and/or other objects), and processes the messages for display of message content in a user interface of the messaging application. The messages can be received at the electronic device directly from another electronic device of another user, from a server or from another networked device. In another example, a browser application can receive network data such as a hypertext transfer protocol (http) response to an http request, and processes the http response, for display of web content in a user interface of the browser application, and/or to obtain other resources according to the http response.

Network data is often received in an encoded data stream that is provided to the corresponding application to be parsed, decoded, and/or unpacked into useful data (e.g., objects of various object types, such as text fields, images, video, graphics, and/or other message content) for further processing by the application (e.g., for display of a message or for rendering of a web page).

Network systems and servers, and/or security software at a receiving device, can scan an incoming message or other network data for known malicious content. These systems and/or security software are intended to prevent known malicious content from reaching the device or from being accessed at the device. However, such systems and/or security software are sometimes difficult or impossible to apply to the network data until an application for which the network data is intended has parsed, decoded, and/or unpacked the data. Accordingly, application-specific processes for parsing, decoding, and/or unpacking network data can be vulnerable to malicious or unintended corruption that can crash the application and/or other portions of the device even after passing through security software. Moreover, these systems and/or security software are typically unable to stop malicious or other potentially problematic content that is not yet known.

In accordance with implementations of the subject technology, application-specific network data filtering is provided that assumes that there will be objects and/or other message content received and processed at the device that will cause crashes/compromises/corruption of the application-specific processes for processing the network data, that may otherwise be undetected by preceding security software. In order to ensure that these compromised processes do not compromise the application or other portions of the device, the application-specific processes to parse, decode, and/or unpack the network data are performed within a sandbox that is separate from the application. Following the application-specific operations within the sandbox, objects generated from the network data within the sandbox are passed through a schema validation that is separate from the sandbox and the application. Validated objects that pass the schema validation can be provided to the application for further processing and/or display in a user interface of the application.

Because of tight limits on the sandbox permissions, and the subsequent schema validations, even if some or all of the application-specific operations of the sandbox are compromised or corrupted, this compromise/corruption is prevented from causing other problems for the application or the device. Allowing some or all of the processes of the sandbox to be corrupted by the application-specific operations in this way allows the sandbox and schema validation disclosed herein to catch known and unknown problems in incoming network data.

In accordance with one or more implementations, a method is provided that includes, within a sandbox that is separate from an application that is configured to process a message, (i) determining an object type for an object received in the message, and (ii) generating the object based on the determined object type, and then performing, outside of the sandbox and outside of the application, a schema validation of the object based on the determined type.

Various examples are described herein in which the network data includes a message to be provided to a messaging application. However, it should be appreciated that the subject technology can apply to any data received over a network or from another device for use with a particular application. Other examples of network data can include push notifications, http request responses, downloaded documents, or the like.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104, a network 106, and one or more servers 120 communicatively coupled to the network 106. The network, 106 may, for example, be include portions of a public network such as the Internet. The network 106 may include local area network (LAN) components, such as Wi-Fi routers and/or Ethernet connections that are local to each of electronic devices 102 and 104, that couple the corresponding electronic device to the wider Internet. A LAN that connects electronic devices 102 and/or 104 to the Internet may include one or more different network devices/network mediums and/or may utilize one or more different wireless and/or wired network technologies, such as Ethernet, optical, Wi-Fi, Bluetooth, Zigbee, Powerline over Ethernet, coaxial, Z-Wave, generally any wireless and/or wired network technology that may communicatively couple an electronic device to the Internet. Portions of the network 106 include a cellular communications network that includes one or more base transceivers at fixed locations in each of several geographic "cells", the base transceivers communicating wirelessly with end devices such as electronic devices 102 and 104, and via wired and/or satellite communications with various switched networks for voice calls and text messages, mobile data, and public telephony.

Electronic devices 102 and 104 may send and/or receive messages such as text messages, multi-media messages, to and/or from each other, and/or to and/or from other electronic devices directly and/or via the network 106. Electronic device 102 and/or 104 may also receive messages and/or other network data from or via one or more servers such as servers 120. In order to prevent network data received over network 106 from crashing or otherwise corrupting or compromising portions of the device, electronic devices 102 and 104 may implement application-specific filtering of the network data as described herein.

One or more of the electronic devices 102 and 104 may be, for example, a portable computing device such as a laptop computer, a smartphone, a smart speaker, a peripheral device (e.g., a digital camera, headphones), a digital media player, a tablet device, a wearable device such as a smartwatch or a band, or any other appropriate device that includes and/or is communicatively coupled to, for example, one or more wired or wireless interfaces, such as Wi-Fi communications circuitry, cellular communications circuitry, Bluetooth communications circuitry, Zigbee communications circuitry, near field communication (NFC) communications circuitry, and/or other wired or wireless communications circuitry, and is provided with software and/or hardware for sending and receiving electronic messages.

By way of example, in FIG. 1 each of the electronic devices 102 and 104 is depicted as a smart phone. In one or more implementations, one or more of the electronic devices 102 and 104 may be a smart television, a laptop or a mobile device, such as a smart phone or a smart watch. In one or more implementations, one or more of the electronic devices 102 and 104 may be integrated into its corresponding display device. One or more of the electronic devices 102 and 104 may be, and/or may include all or part of, the electronic system discussed below with respect to FIG. 7.

The electronic devices 102 and 104 may include a processor, a memory, a communication interface, and/or other electronic components. The processor may include suitable logic, circuitry, and/or code that enable processing data and/or controlling operations of the device. In this regard, the processor may be enabled to provide control signals to various other components of the device. The processor may also control transfers of data between various portions of the device. Additionally, the processor may enable implementation of an operating system or otherwise execute code to manage operations of the device. The memory may include suitable logic, circuitry, and/or code that enable storage of various types of information such as received data, generated data, code, and/or configuration information. The memory may include, for example, random access memory (RAM), read-only memory (ROM), flash, and/or magnetic storage. In one or more implementations, one or more of the processor, the memory, the communication interface, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

One or more of the servers 120 may be, and/or may include all or part of the electronic system discussed below with respect to FIG. 7. Each of the servers 120 may include one or more servers, such as a cloud 130 of servers. For explanatory purposes, two servers are shown and discussed with respect to various operations for providing network data to and/or between electronic devices 102 and 104. However, these and other operations discussed herein may be performed by one or more servers, and each different operation may be performed by the same or different servers.

For explanatory purposes, the network environment 100 is illustrated in FIG. 1 as including electronic devices 102 and 104, and the servers 120; however, the network environment 100 may include any number of electronic devices and any number of servers.

Figure 2:
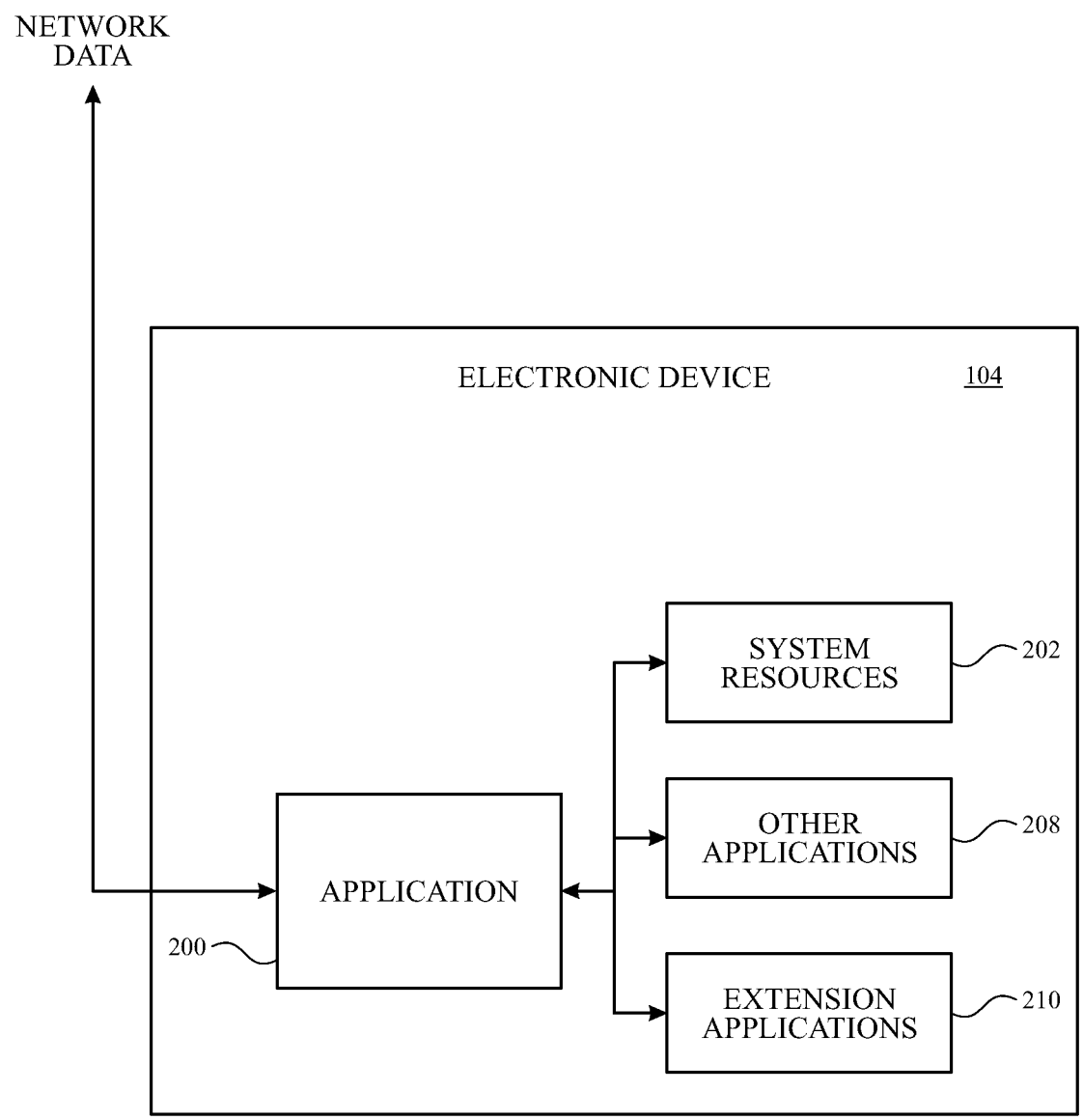
FIG. 2 illustrates a schematic diagram of an example electronic device having an application in accordance with one or more implementations.

FIG. 2 illustrates various aspects of an electronic device having an application. In the example of FIG. 2, electronic device 102 includes an application 200 (e.g., stored in memory at the device and executable by one or more processors of the device). As shown, the application 200 may receive network data (e.g., over a network 106 and/or from another electronic device such as electronic device 102). For example, the network data may include a message from electronic device 102, or server data (e.g., a push notification or web content for a web page) from a server such as server 120. The network data may be application-specific network data to be processed by a specific application 200 at the electronic device 104. For example, the application 200 may be a messaging application for processing messages, a web browser application for processing web page data, a word processor application for processing downloaded word processor documents, a third party application for processing network data (e.g., push notifications) from a third party server associated with the third party application, or any other application configured to receive and/or process network data that is specific to that application.

In order to process the network data, the application may access various hardware and/or logical resources at the electronic device. For example, the application 200 may have access to system resources 202 (e.g., hardware resources such as the CPU, GPU, or memory of the device, and/or logical resources such as system resources for accessing data in the memory and/or accessing other components of the device). As shown, the application 200 for which the network data is intended may also have access to other applications 208 and/or extension applications 210 that can be activated and/or operated by the application 200 based on the received network data.

However, providing application 200 with access to the system resources 202, the other applications 208, and the extension applications 210 (as examples) can expose the system resources 202, the other applications 208, and/or the extension applications 210 to corrupted and/or malicious data included in the network data. This type of corrupted and/or malicious data can cause a crash and/or other compromised behavior of the application 200, the system resources 202, the other applications 208, and/or the extension applications 210, if allowed to reach and/or compromise the application operations that process the network data.

Figure 3:
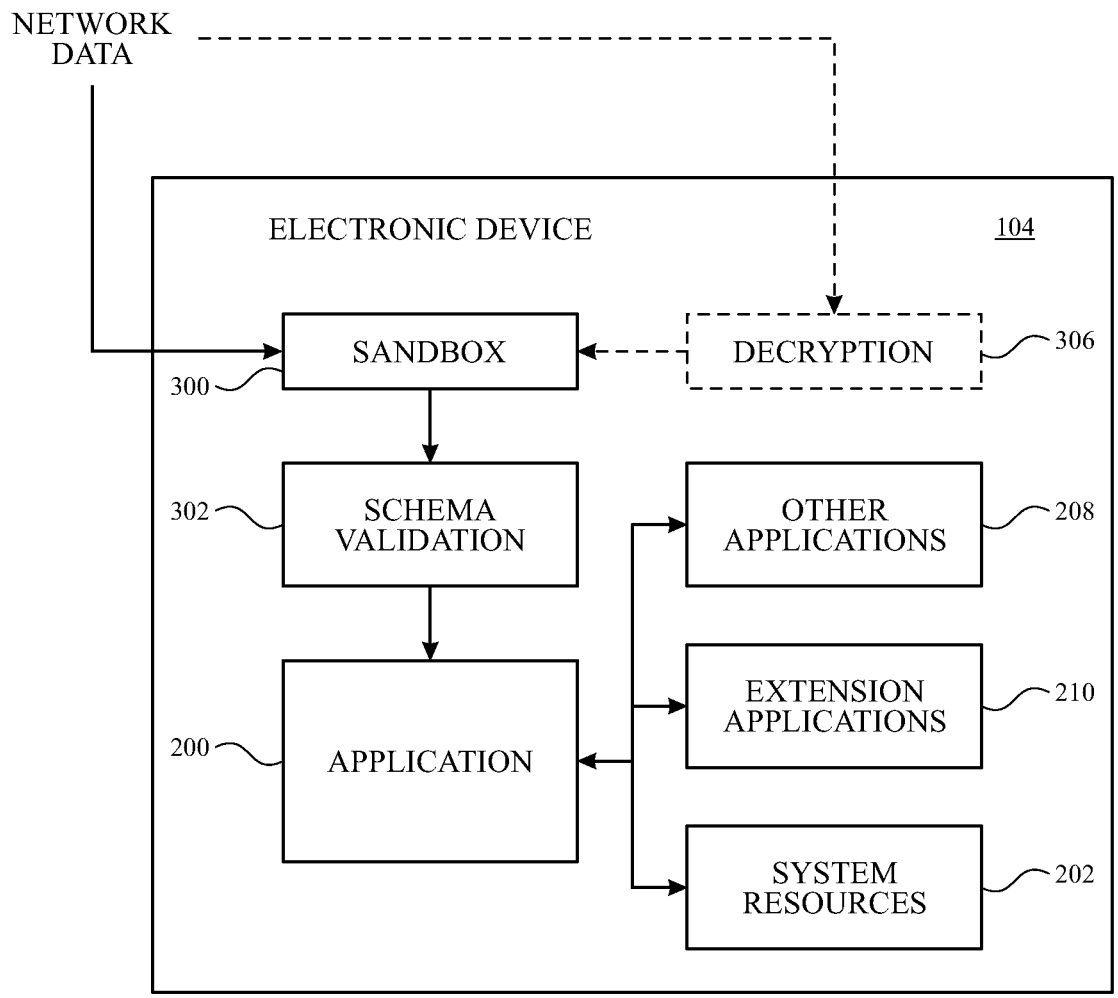
FIG. 3 illustrates a schematic diagram of an example electronic device implementing application-specific network data filtering in accordance with one or more implementations.

In accordance with one or more implementations of the subject technology, electronic device 104 can be provided with application-specific network data filtering, as illustrated in FIG. 3, to prevent corrupted and/or malicious network data from reaching and/or compromising the application 200 and/or the other system components and/or resources to which the application has access.

As shown in the example of FIG. 3, electronic device 104 may include a sandbox 300 that receives network data intended for an application 200. The sandbox 300 may be a restricted environment from which code (e.g., parsers, decoders, transcoders, and the like) can be executed for unpacking the network data for use by the application 200. As shown, the sandbox 300 may be separate from the application 200, and may be prevented, such as by the operating system, from accessing the other application 208, extension application 210, and/or system resources 202 that are accessible by application 200. In one or more implementations, the sandbox 300 may be a compute-only sandbox, e.g., the sandbox may only have access to compute resources or only to specific compute resources, such as to the CPU and not to a GPU. For example, a compute-only sandbox may be prevented from accessing (e.g., reading or modifying) data stored in memory of the device, other than the data provided with the message. The compute-only sandbox may be provided with a limited amount of memory for use in performing the computations for parsing, decoding, transcoding, and/or unpacking the message, without reading or modifying existing data at the device. The compute-only sandbox may be prevented from accessing, controlling, or otherwise interacting with operable components of the device such as sensors, cameras, speakers, microphones, or the like. The compute-only sandbox may be prevented from sending or receiving data to other devices, systems, or servers. For example, if a process within the sandbox is compromised by malicious code that attempts to modify or delete data from the device, obtain other malicious content from another device for installation at the device, or transmit device/user information stored at the device to another device, these operations would be prevented due to the compute-only arrangement of the sandbox. Code executed within the sandbox may include code that is specific to the application 200.

For example, the electronic device 104 may receive a message that includes information associated with an object having an object type. In this example, the application 200 may be configured to process the message to provide message content including the object to a user interface. In this example, when the network data (e.g., the message) is received, the message may be provided to the sandbox 300, and the electronic device 104 may perform application-specific operations for the application, on the message, in the sandbox 300 that is separate from the application. In this example, the application-specific operations may include determining the object type, and attempting to generate the object from the information associated with the object in the message, based on the determined object type.

For example, the object type may correspond to a color, an image, an array, text, a typing indicator, a font, etc. Within the sandbox 300, the electronic device 104 may parse the message to determine the object type (e.g., and to determine the location of the information associated with the object within the message), and may then attempt to generate the object from the information associated with the object based on the determined object type. For example, if the object type is an image, the electronic device 104 may attempt, within the sandbox 300, to generate an image object from image data included within the message (e.g., by extracting the image data corresponding to the image from the message and decoding, transcoding, and/or unpacking the extracted image data to form a data structure in a format that is expected by schema validation 302). For example, within the sandbox 300, a string of data (e.g., binary data) in the format of the original message may be determined by one or more parsers to correspond the image data for an image. Within the sandbox 300, the message data determined to be image data may be processed to form an image object, such as a data structure including an (e.g., serialized) array of numerical values and a header or other wrapper for processing by schema validation 302. If an image object generated in the sandbox is validated, at schema validation 302, as an image object (e.g., as a data structure including an array of numerical values as expected), the image object may be passed to the application 200. Application 200 may then further process the image object (e.g., using additional resources, such as the GPU or an extension application, that were not available to the processes within the sandbox 300), to generate an image, corresponding to the image object, for display. For example, the application 200 may process the image object to adjust a color space of the image as represented by the image object, to a different color space, based on properties of the device display and/or of the user interface of the application. As another example, the application 200 may further process the image object for display within a message stream in the user interface of the application. As another example, the application 200 may combine the image with additional content according to additional information received in the message.

In some scenarios, the processes in the sandbox 300 may be corrupted or compromised by the message data. For example, the message may include a string of characters that, whether unintentionally or with malicious intent, causes a parsing operation or a decoding operation within the sandbox to crash. This type of crash may prevent the object from being generated, or may cause the object to be generated in a way that does not conform to a schema for the object type and/or for the application. In one or more implementations, a schema for an application may identify each different object type that the application expects to receive and may include one or more parameters for validating the object type (e.g., any string objects should have a maximum length of X, any image objects should have a maximum size of 5 MB, etc.). In scenarios in which the crash prevents the object from being generated, the object may be prevented from reaching the application 200. In scenarios in which the crash causes the object to be generated in a way that does not conform to a schema for the object type, a schema validation 302 that is separate from the sandbox 300 and the application 200 can determine that the object that does not conform to a schema for the object type and can prevent the object from being delivered to the application 200. In one or more implementations, the schema validation 302 may be performed in a second sandbox (e.g., a second compute-only sandbox) that is separate from the sandbox 300 and from the application 200. The schema validation 302 may be, for example, a schema-based validation that is performed using a validation schema.

In some operational scenarios, the application-specific operations performed within the sandbox 300 can cause a crash of the entire sandbox 300, or can allow malicious code to entirely take control of the sandbox 300. However, because the sandbox 300 is a controlled environment separate from the application 200, the crashed and/or corrupted application-specific processes (e.g., including crash, a total loss of control, or a total failure of the entire sandbox) do not affect any other operations of the device. In one or more implementations, the electronic device may send a failure message to the sending device of the message if the application-specific operations cause a crash of the entire sandbox and thereby prevent the message from being delivered to the application 200.

It should also be appreciated that, short of total failure of the operations in the sandbox 300, the sandbox 300 may still output one, some or all of the objects from the message for schema validation 302. In various scenarios, the objects may or may not be validated by the schema validation 302.

When an object is generated within the sandbox 300 and provided to the schema validation 302, performing the schema validation 302 may include validating the object based on the object type (e.g., as determined within the sandbox and/or re-determined as part of schema validation 302) and based on a schema corresponding to the object type. In one or more implementations, schema validation 302 is performed on property list (e.g., plist) types such as a dictionary type, an array type, a string type, a number type, a null type, and a data type. In one or more implementations, schema validation of the data type can be avoided by decomposing, within the sandbox 300, data type objects into dictionary type objects for validation. For example, the operations performed within the sandbox 300 can include transcoding images into an image format, and extracting header information for the image into dictionaries. Raw samples can be passed as data, and the image file re-created (e.g. inside the application 200). In another example, an object with an object type of 'String' may have a corresponding maximum length of N characters. The schema validation 302 may verify that the length of the object is less than the maximum length of N characters.

Although FIG. 3 illustrates a single application 200 and a single corresponding sandbox 300, the electronic device 104 may have multiple applications 200 that receive network data, and multiple corresponding sandboxes 300 within which application-specific operations for that application can be performed, in one or more implementations. For example, a first sandbox 300 for a messaging application may include message processing operations for processing message data, and a second sandbox 300 for a web browser application may include web data processing operations (e.g., operations for parsing http data). For example, message data may be parsed and unpacked differently than an http response for a web browser or than a push notification from a third party server for a third party application.

In one or more implementations, the schema validations 302 may be object specific (e.g., including a schema validation for validating an image, and a different schema validation for validating a string) and used for multiple different application/sandbox pairs. In other implementations, an application-specific set of set of schema validations may be provided for each application.

As indicated in FIG. 3, in some operational scenarios, the network data that is received at electronic device 104 may be encrypted network data, such as an encrypted message. As shown, electronic device 104 may perform decryption operations 306 on an encrypted message to obtain unencrypted message data. In various implementations, the decryption operations 306 can be performed by application 200 prior to providing the unencrypted message to sandbox 300, or the decryption operations 306 may be performed in an additional sandbox (e.g., an additional compute-only sandbox) that is separate from the sandbox 300 and from the application 200 (e.g., to further prevent corrupted and/or compromised decryption operations for affecting the application or other portions of the device). For example, an additional sandbox for decryption operations 306 may be provided with access to decryption keys for the network data that is specific to application 200 (e.g., decryption keys for messages for a messaging application).

Figure 4:
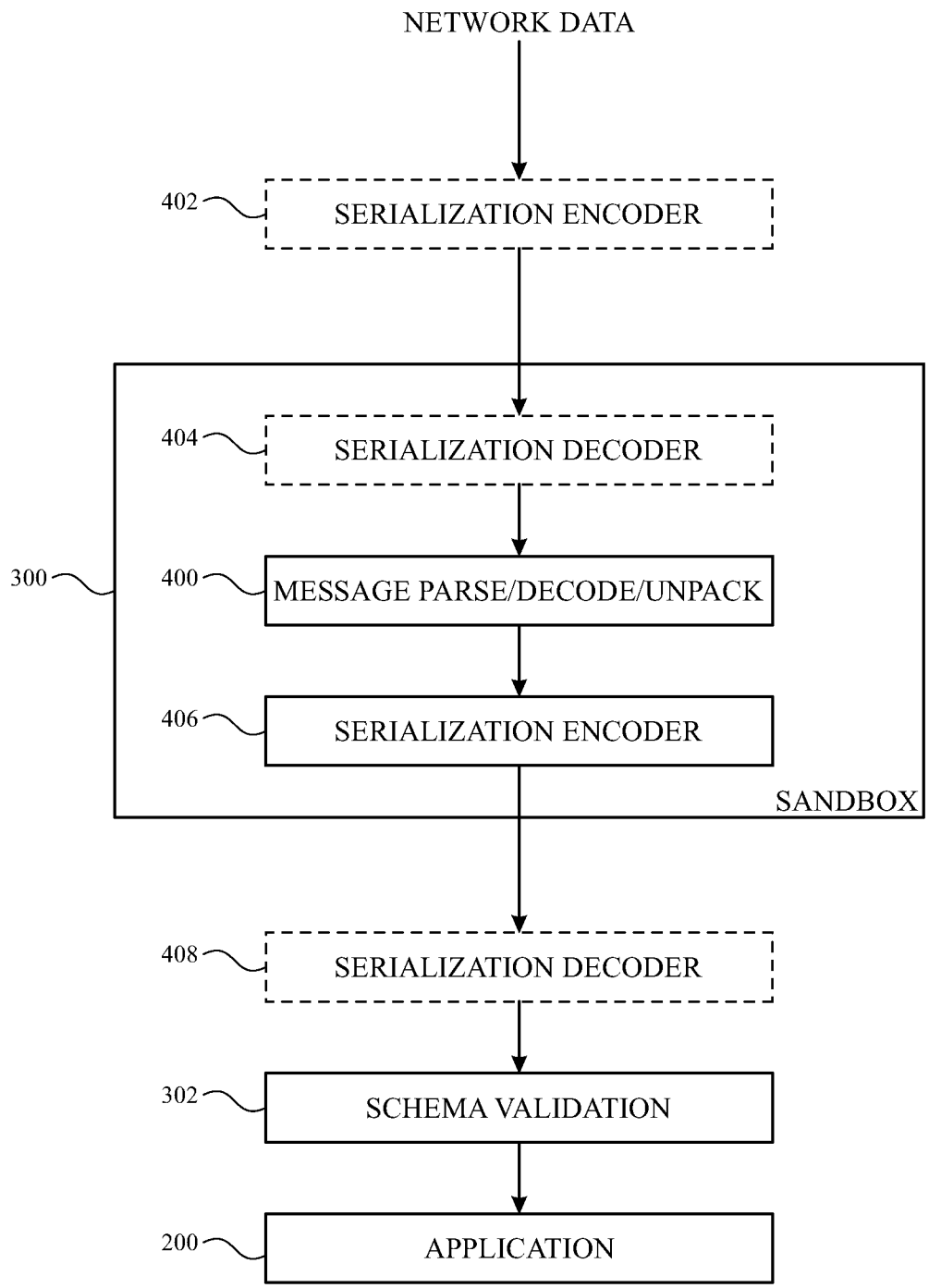
FIG. 4 illustrates an example process for application-specific network data filtering in accordance with one or more implementations.

FIG. 4 illustrates various additional aspects of an example process for application-specific network data filtering. As shown in FIG. 4, within sandbox 300, an electronic device such as electronic device 104 may perform parse, decode, and/or unpack operations 400 on network data received at the device. These parse, decode, and/or unpack operations 400 may be application-specific operations for parsing, decoding, transcoding, and/or unpacking application-specific data for a specific application 200. In some examples, parsing data may include obtaining data from a string of characters or a binary string (e.g., to construct a data structure from the obtained data). In some examples, decoding data may include decoding encoded data that was previously encoded (e.g., at another device or at a server) from unencoded data using an encoding scheme, to obtain the unencoded data. In some examples, transcoding data may include directly converting encoded data that was previously encoded using a first encoding scheme to encoded data encoded using a second, different encoding scheme (e.g., without storing an intermediate decoded version of the encoded data that was encoded with the first encoding scheme). In some examples, unpacking data may include extracting multiple data elements that have been previously packaged into a composite data structure from the composite data structure. For example, a sandbox 300 can be provided for each application for which messages and/or network content that is intended for that application needs to be parsed, decoded, and/or unpacked for further processing by the application.

FIG. 4 also shows how the network data may be passed through one or more serialization operations as part of an application-specific network data filtering process. In the example of FIG. 4, the network data is passed through a serialization encoder 402 (e.g., an XPC encoder) prior to providing the network data to the sandbox 300. The serialization encoder 402 may encode network data that is received in a message encoding format into serialized untrusted packaged network data for parsing, decoding, and/or unpacking by the application-specific processes within the sandbox 300. Within the sandbox 300, the serialized data may optionally be decoded by a serialization decoder 404 for processing by the parse, decode, and unpack operations 400.

Following the application-specific parse, decode, and unpack operations 400 within the sandbox 300, the resulting unpacked objects from the network data may be encoded, within the sandbox 300, into serialized objects by an additional serialization encoder 406. The serialized unpacked objects may then be optionally provided to another serialization decoder 408 for decoding/transcoding for performing the schema validation 302.

In some examples, the serialization encoded data that is output from the sandbox 300 (e.g., from serialization encoder 406 to the serialization decoder 408 or schema validation 302) is different from the serialized encoded data that is input to the sandbox 300 (e.g., from serialization encoder 402). This is, in part, because the object types for the objects to be generated from the network data may not be known prior to the parse, decode, and unpack operations 400 within the sandbox 300.

As one illustrative example, the parse, decode, and unpack operations 400 may include operations for parsing and/or unpacking a color represented in various input representations (e.g., a representation for a color for text, a representation for a color for portable document format, or a representation for a background color for a transparent image) in the network data. The parse, decode, and unpack operations 400 may include operations for parsing and/or decoding a color represented in any of these multiple representations. In contrast, once the color is parsed and unpacked by the parse, decode, and unpack operations 400 in the sandbox 300, the serialization encoder 406 can encode a color received in any representation into a single (e.g., canonical) representation of a color (e.g., as an array of four components). Including the parse, decode, and unpack operations 400 associated with the various parsing/unpacking operations for various representations of various data types within the sandbox 300 can prevent any expected or unexpected vulnerabilities associated with the various parsing/unpacking operations for various representations of various data types from being a vulnerability to the application 200 itself or to logical and/or hardware resources to which the application 200 has access.

The application-specific network data filtering process illustrated in FIG. 4 can decode and/or transcode components from their original format (e.g., keyed archivers, plists, protobufs, image/data decoders, etc.) into base serialized (e.g., XPC) objects, and can enforce a strict schema over the resulting serialized objects (e.g., to mitigate logic bugs in the processing). As the serialized objects are transformed back into a structure representation, the schema can be validated to ensure the types of the fields are correct, and that their validation invariants are evaluated successfully.

The application-specific network data filtering process illustrated in FIG. 4 can help ensure that transcoding and/or parsing errors all occur within the sandbox 300, can help ensure that the schema validation 302 provides strict validation of decoded parameters and combinations of parameters, and can prevent an addition to a zero click attack surface without verification of schema extensions.

In one or more implementations, multiple sandboxes 300 may be provided for a single application 200 (e.g., individual sandboxes for different parts of a message). For example, FIG. 5 illustrates an example in which a chain of application-specific network filtering processes can be chained together to safely download and transcode network data such as images and/or video attachments.

Figure 5:
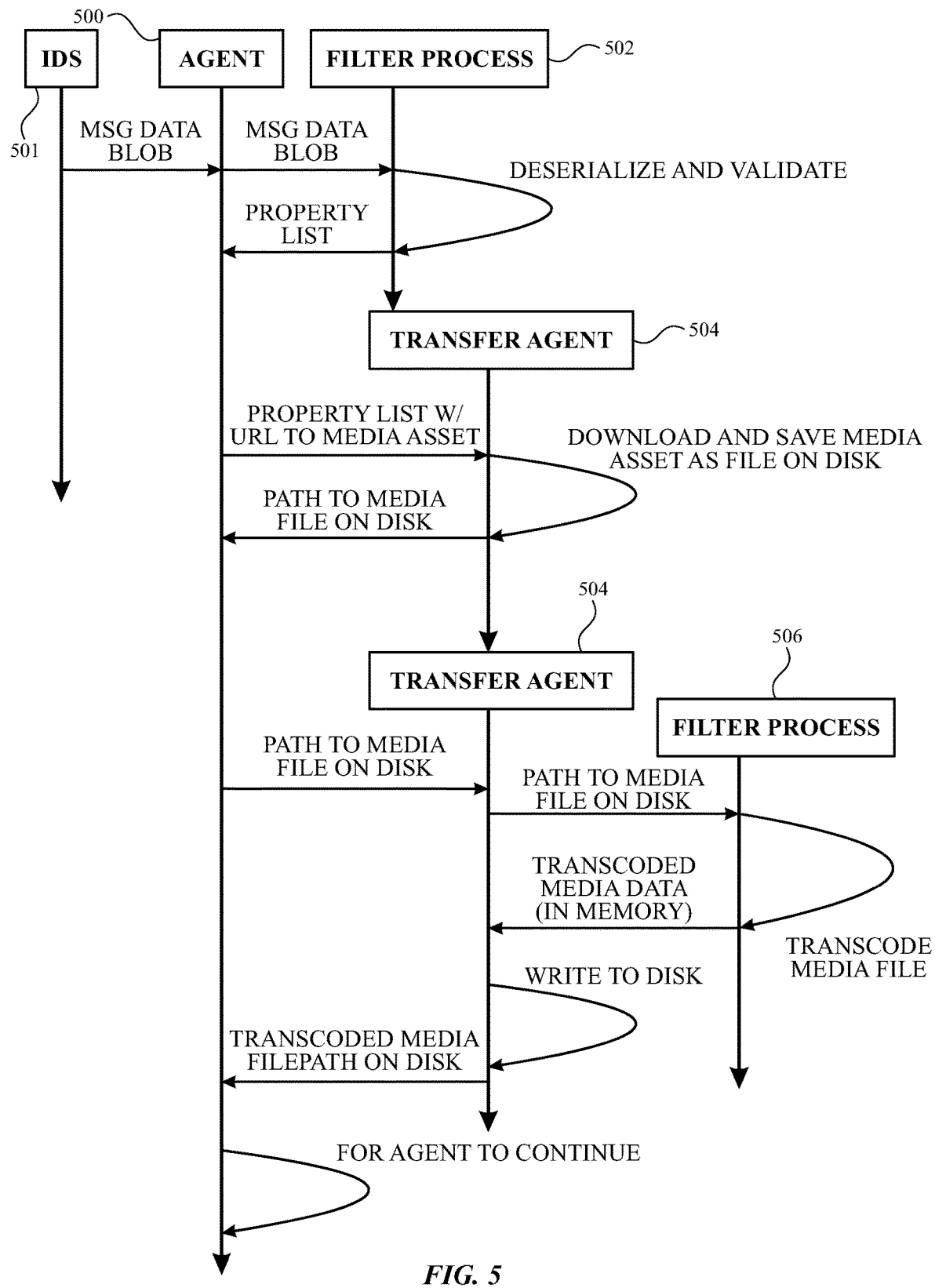
FIG. 5 illustrates an example process for chained application-specific network data filtering in accordance with one or more implementations.

As shown in FIG. 5, an IDS client 501 for messaging may provide network data such as a message data blob to an agent 500, such as an agent for managing incoming network data for an application. In the example of FIG. 5, the agent 500 provides the message data blob to a first filter process 502. For example, the first filter process 502 may be an application-specific network data filtering process (e.g., including a first implementation of a sandbox 300, a schema validation 302, and/or other processes as described above in connection with FIGS. 3 and/or 4) for a messaging application.

As shown, the first filter process 502 may deserialize and validate the message data blob, and return a validated property list (e.g., plist) to the agent 500. The agent 500 may provide the property list and a uniform resource locator (URL) for a media asset obtained from the message data blob to transfer agent 504. The transfer agent 504 may download and save the media asset from the URL as a file on disk. The transfer agent 504 may provide a path to the downloaded and saved media asset on disk to the agent 500.

The agent 500 may provide the path to the media file on disk to a second filter process 506. For example, the second filter process 506 may also be an application-specific network data filtering process (e.g., including a second implementation of a sandbox 300, a schema validation 302, and/or other processes as described above in connection with FIGS. 3 and/or 4) for processing images for a messaging application. As shown, second filter process 506 may include performing operations to transcode the media file (e.g., using one or more image related application programming interfaces (APIs) and/or other processes) to a predetermined format (e.g., a compression format such as an Adaptive Scalable Texture Compression (ASTC) format). The second filter process 506 may provide the transcoded media (e.g., in memory) to the transfer agent 504. The transfer agent 504 may write the transcoded media to disk, and provide a transcoded media file path for the transcoded media to the agent 500 for continued operations (e.g., for displaying the image using a user interface of a messaging application).

Using the chained filter processes 502 and 506 in FIG. 5, each including a sandbox 300 and a schema validation 302, the message and the image and/or video attachments associated with the message can be processed and validated using multiple application-specific network data filtering processes as described herein. In one or more implementations, the schema validation 302 may be application-specific, in which case the same schema validation 302 may be used for each of the chained filter process 502 and 506.

Figure 6:
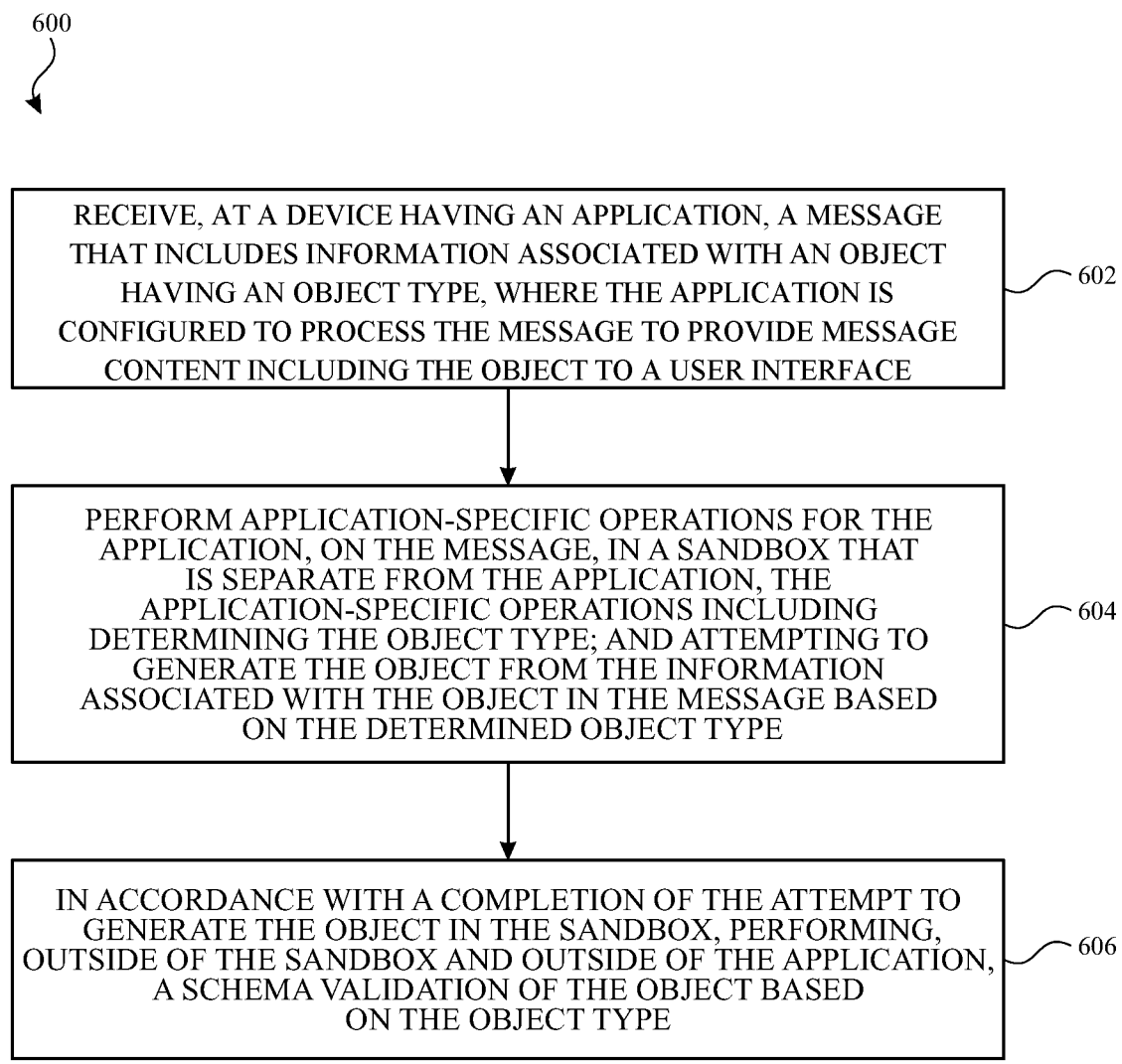
FIG. 6 illustrates a flow diagram of an example process for application-specific network data filtering in accordance with one or more implementations.

FIG. 6 illustrates a flow diagram of an example process 600 for application-specific network data filtering, in accordance with one or more implementations. For explanatory purposes, the process 600 is primarily described herein with reference to the electronic devices 102 and 104, and the servers 120 and 140 of FIG. 1. However, the process 600 is not limited to the electronic devices 102 and 104, and the servers 120 and 140 of FIG. 1, and one or more blocks (or operations) of the process 600 may be performed by one or more other components and/or other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, at a device having an application (e.g., application 200 as described herein), a message may be received that includes information associated with an object having an object type. The application may be configured to process the message to provide message content including the object to a user interface. The application may be, for example, a messaging application or another application that can receive and process messages, message objects of various object types, and/or other message content. For example, the messaging application may include a user interface for displaying messages to a user, and for receiving message input for composing outgoing messages. Examples of object types can include colors, images, video, text, typing indicators, fonts, etc.

At block 604, application-specific operations for the application may be performed, on the message, in a sandbox (e.g., sandbox 300 as described herein) that is separate from the application. The application-specific operations may include determining the object type. The application-specific operations may also include attempting to generate the object from the information associated with the object in the message, based on the determined object type. In some examples, the sandbox is arranged to permit the application-specific operations to corrupt one or more of the application-specific operations and the sandbox itself, and to prevent any corruption of the application-specific operations or the sandbox itself from corrupting the application or other portions of the device. In some examples, determining the object type includes parsing the message to obtain the object type. In some examples, generating the object includes unpacking the message based on the parsing.

In various examples, a message can include one or multiple types of objects. A message payload that comes into the sandbox may not include metadata that identifies an object type. In these examples, the message payload is processed (e.g., parsed, decoded, and/or unpacked by the application-specific processes) within the sandbox to find out the type(s) of object(s) for which information is included in the message. In these examples, the type(s) of object(s) may be provided from the sandbox to the application for further processing and/or display of the object(s).

In one or more implementations, the operations described herein in connection with block 604 may be performed within memory pre-allocated for the sandbox (e.g., prior to and/or independently of receipt of any data for processing within the sandbox). In one or more other operations, the operations described herein in connection with block 604 may be performed in additional memory allocated by the application, for the sandbox 300 (e.g., as described in further detail hereinafter in connection with FIGS. 7, 8, and/or 9).

At block 606, in accordance with a completion of the attempt to generate the object in the sandbox a schema validation (e.g., schema validation 302 as described herein) of the object may be performed, outside of the sandbox and outside of the application, based on the object type. In one or more implementations, the schema validation occurs inside of a second sandbox that is separate from the sandbox and from the application. In some examples, the schema validation is performed responsive to a completion of at least some of the application-specific operations of block 604. For example, if all of the application-specific operations fail and/or if the sandbox itself is corrupted or crashes, the message/object may not pass through the sandbox to the schema validation. In accordance with an incomplete attempt to generate the object in the sandbox, data associated with the object may be prevented from being provided to the schema validation or to the application. In some examples, an incomplete attempt can be a failure of one or more of the application-specific processes for generating the object. Although examples are described herein in which a single object of a single object type is generated and validated using schema validation 302, it should be appreciated that, in one or more implementations, multiple objects of multiple different types may be generated within sandbox 300 and then validated using the schema validation 302.

In some examples, another portion of the message can be provided to the application, even when the object doesn't get through the sandbox (e.g., due to an incomplete attempt to generate the object within the sandbox). For example, within the sandbox, another object may be generated from the message, and another schema validation may be performed for the other object, outside the sandbox and outside the application, based on another object type for the other object. A validated object corresponding to the other object can be provided to the application in accordance with a successful schema validation of the other object.

In some scenarios the entire sandbox may be corrupted such that the application-specific operations fail to generate any output from the sandbox. In accordance with a total failure of the application-specific operations in the sandbox, delivery of the message to the application may be prevented. In circumstance in which delivery of the message to the application is prevented, a failure notification may be sent to a remote device, such as a messaging server or a device of a sender of the message.

In accordance with a successful schema validation of the object generated in the sandbox, a corresponding validated object may be provided to the application. In one or more implementations, the successful schema validation indicates that the object conforms to a schema for the object type. In one or more implementations, it may be determined, based on the schema validation of the object, that the object does not conform to an expected schema for the object type. Responsive to the determination that the object does not conform to a schema for the object type, the object may be prevented from being provided to the application.

In one or more implementations, the message may be an encrypted message. In scenarios in which the message is an encrypted message, the encrypted message may be decrypted prior to performing the application-specific operations on the message in the sandbox, to obtain unencrypted message data including the information associated with the object. The encrypted message may be decrypted by the application and then provided to the sandbox, or can be decrypted in an additional sandbox that is separate from the sandbox and from the application. In some examples, the additional sandbox has access to decryption keys for the message (e.g., for decrypting the message).

In the examples described herein in connection with, for example, FIGS. 2-6, various features of an application-specific processes to parse, decode, and/or unpack network data are described as being performed within a sandbox that is separate from an application for processing the network data. In one or more implementations, the sandbox may have a limited and/or fixed amount of memory available for storing and/or processing the network data. In one or more operational scenarios, the network data may have a size that is too large for storage and/or processing within the memory that is available to the application-specific processes (e.g., within memory allocated for sandbox 300).

In accordance with aspects of the disclosure, the application-specific processes may determine (or be notified) that network data to be processed in the sandbox has a size that is too large for storage and/or processing within the memory that is available to the sandbox, and may request allocation of additional memory. However, because, for example, the application-specific processes in the sandbox may not have access to system resources, such as a memory manager, the application-specific processes may be unable to request memory from the system processes and/or may be prevented from being allocated additional memory.

In accordance with aspects of the disclosure, the application-specific processes may request allocation of additional memory from the application or other process for which the network data has been received. For example, FIG. 7 illustrates an operational scenario in which, sandbox 300 includes a memory region 703 that is exclusively allocated for use by processes in the sandbox 300. In various implementations, the memory region 703 for the sandbox 300 may be a physically separate memory region, and/or logically separate memory region, from system memory 702 of the electronic device 104 (e.g., as in the example of FIG. 7) or may be a region of the system memory 702 that is specifically and exclusively allocated for the sandbox 300 (e.g., prior to receipt of the network data).

In one or more operational scenarios, the network data received at the electronic device 104 may be too large for processing and/or storage in the memory region 703 for the sandbox 300. For example, the memory region 703 may have a fixed size that is insufficient to store the output of the first processing and/or to store intermediate processing data of the first processing.

In one or more implementations, the application 200 may make an initial call to the application-specific processes within the sandbox 300 to determine a file type, a size, and/or other object information associated with data (e.g., network data) to be processed by the application. For example, within the sandbox 300, the electronic device 104 may parse a message to determine an object type of an object to be generated from the message data and to determine the location of the information associated with the object within the message. For example, if the object type is an image, the electronic device 104 may attempt, within the sandbox 300, to determine the image type and to obtain a size of the image. The image type, the image size, and/or other metadata obtained from the message with the sandbox 300 may be provided (e.g., following successful validation of the image type and/or image size by schema validation 302) to the application 200. In one or more implementations, the size information provided from the sandbox 300 to the application 200 may constitute, or may be provided in the form of, a memory request. In one or more implementations, a memory request may also include an indication to the application 200 that the image size is larger than the size of the memory region 703 that is available to the sandbox 300, or an indication of an amount of additional memory needed by the sandbox 300 to process the image. In other implementations, the application 200 may determine that additional memory is to be allocated based on the image size (e.g., by determining that the image size is larger than a size threshold, such as larger than the size of the memory region 703).

Figure 7:
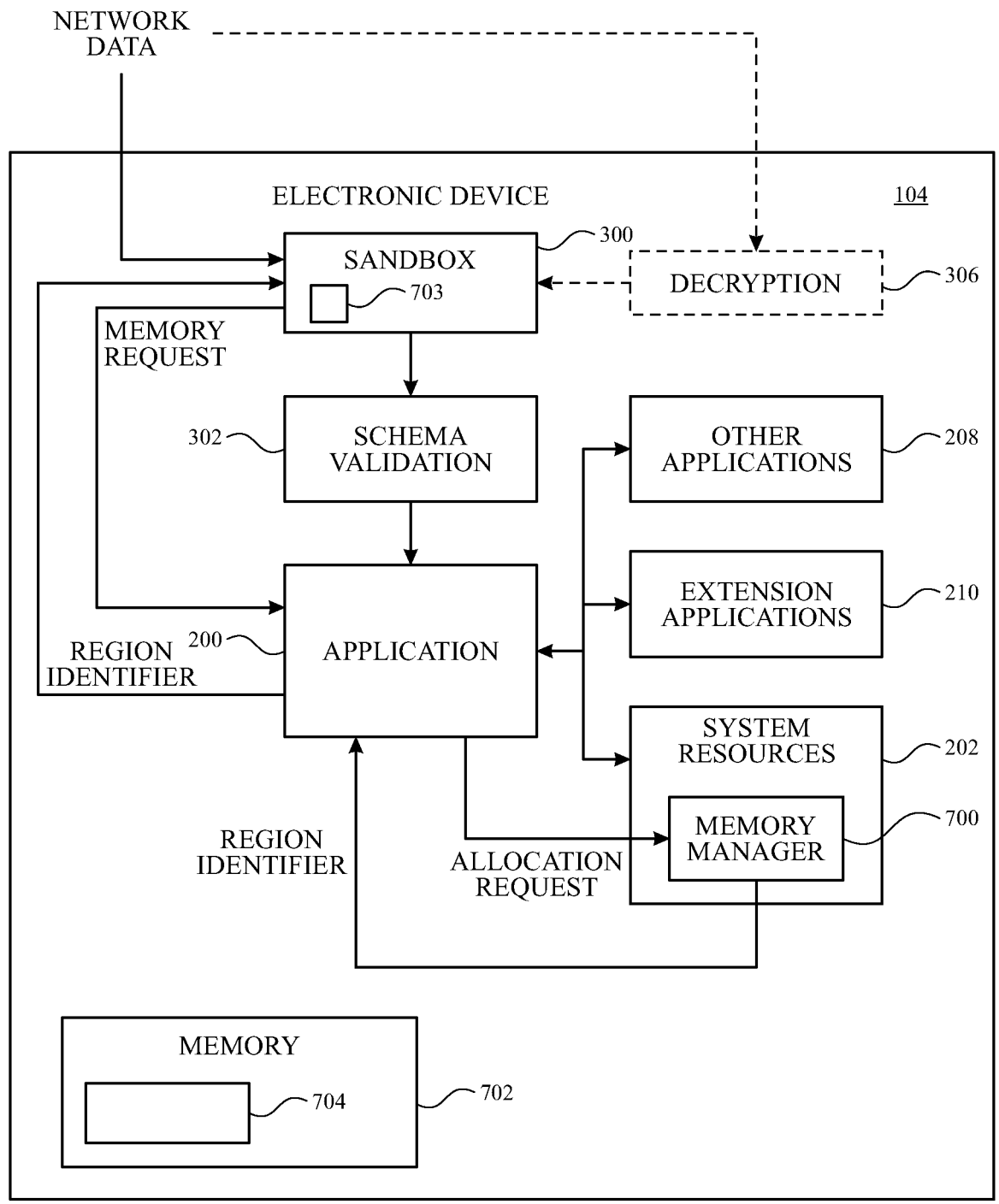
FIG. 7 illustrates a schematic diagram of an example electronic device implementing allocation of memory of one process for use by another process in accordance with one or more implementations.

As shown in the example of FIG. 7, once it is determined (e.g., by the application-specific processes within the sandbox 300 and/or the application 200) that the memory region 703 is an insufficient size to perform the application-specific processes using the memory region 703 and/or the image size has been provided to the application 200, the application 200 may provide (e.g., responsive to receiving the size information and/or the memory request from the sandbox 300) an allocation request to a memory manager 700 of the electronic device 104. For example, the application 200 may have a memory region 704 (e.g., an address space in the memory 702) that is allocated for use by the application. The allocation request may include a request to register a port, and/or pipe, for communication between the application and the sandbox 300. The memory manager 700 may generate (e.g., responsive to the allocation request from the application) an identifier (e.g., a descriptor, such as a file descriptor) for the communication. The application 200 may map or link the identifier to the memory region 700.

The application 200 may make a (e.g., second) call to the sandbox 300 to perform a first processing (e.g., to extract the image data corresponding to the image from the message and decode, transcode, and/or unpack the extracted image data to form a data structure in a format that is expected by the application 200 and/or by schema validation 302). The second call to the sandbox 300 may include the identifier as a region identifier for the memory region 704. In this way, when the processes within the sandbox 300 writes an output to the region identifier (e.g., as authorized by the memory manager responsive to the request by the application 200), output from the sandbox 300 is written to the memory region 704 that has been allocated for the application 200. In one or more implementations, the region identifier may include a uniform resource identifier or a uniform resource locator corresponding to the memory region 704. In one or more implementations, because the memory region 704 is allocated to the application 200, the memory manager 700 accounts the memory region 704 to the application 200 (e.g., and not to the sandbox 300), even though the application-specific processes within the sandbox 300 utilize the memory region 704.

Figure 8:
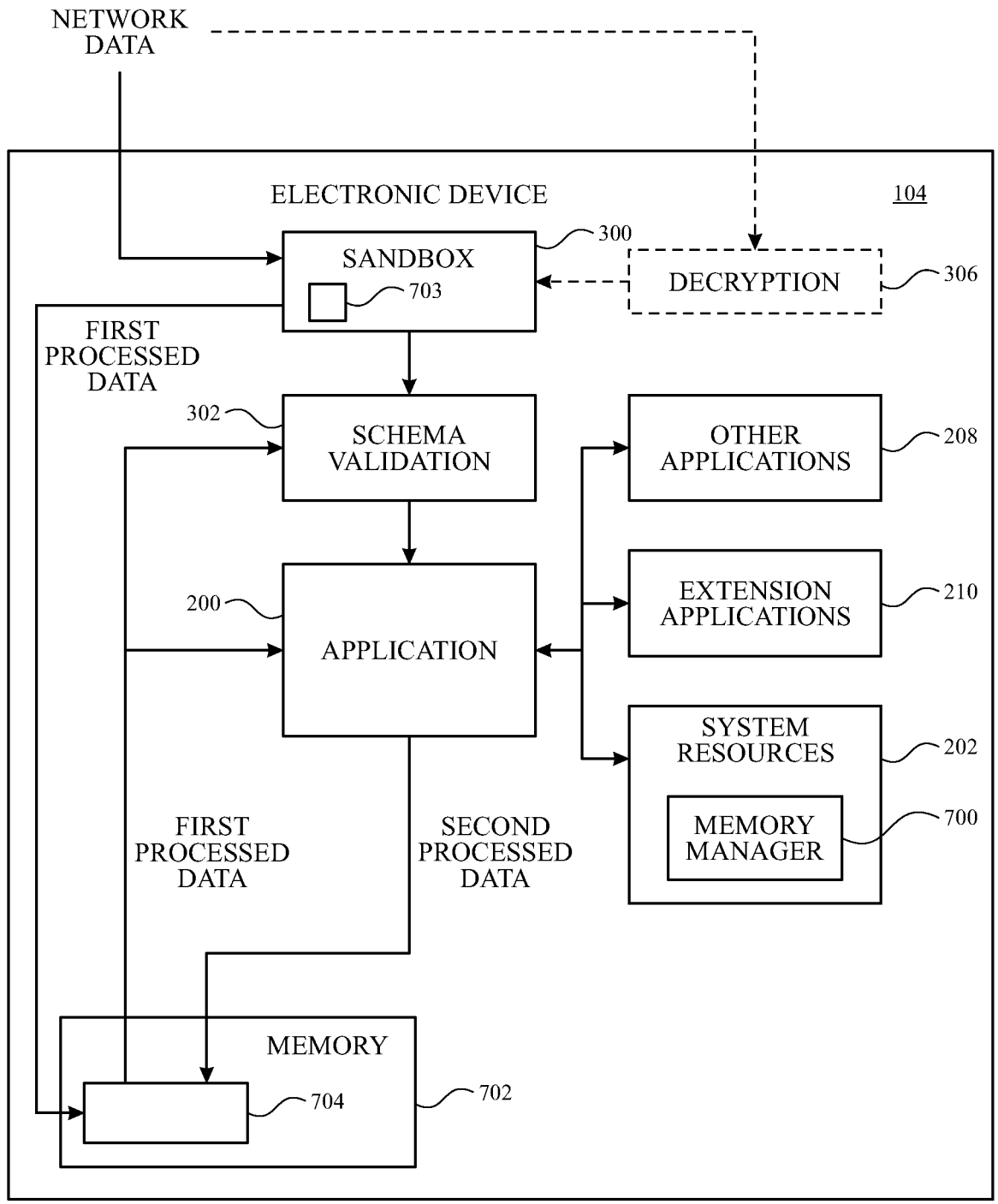
FIG. 8 illustrates a schematic diagram of an example electronic device implementing use, by a first process, of memory allocated for another process in accordance with one or more implementations

As shown in FIG. 8, using the region identifier provided from the application 200, the application specific process(es) in the sandbox 300 can the provide (e.g., write) first processed data to the memory region 704. As shown, the first processed data stored in the memory region 704 can then be accessed by the schema validation 302 and/or recalled and/or otherwise accessed by the application 200 for further processing (e.g., processing as described herein in connection with any or all of FIGS. 2-6). As illustrated in FIG. 8, the application 200 may further process the first processed data and generate second processed data. The second processed data may be stored in the same memory region 704, or may be stored in additional memory allocated for the application by the memory manager.

The example of FIGS. 7 and 8 is described in the context of an application allocating memory for use by a sandboxed process. However, it is appreciated that the operations described in connection with FIGS. 7 and 8, in which a first process (e.g., the sandboxed process) at a device receives an allocation of memory from a second process (e.g., the application) that is separate from a memory manager of the device, can be applied to other first and second processes (e.g., in any scenario in which the first process does not have sufficient memory, and in which the memory accounting is to be applied to the second process).

Figure 9:
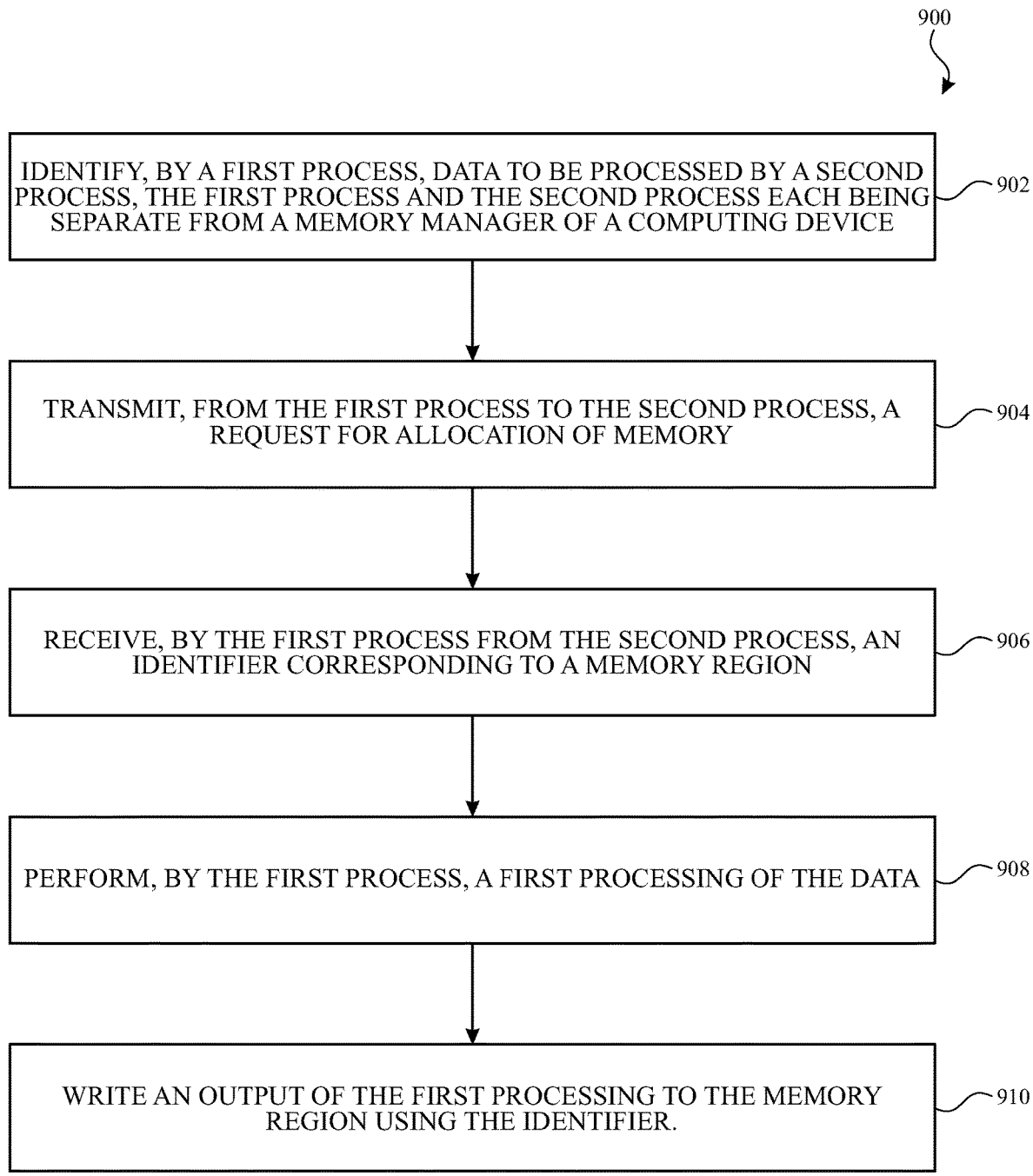
FIG. 9 illustrates a flow diagram of example operations that can be performed by one process for processing data using memory allocated by another process in accordance with one or more implementations.

FIG. 9 illustrates a flow diagram of an example process 900 for processing of data by one process at a device, using memory of another process at the device, in accordance with one or more implementations. For explanatory purposes, the process 900 is primarily described herein with reference to the electronic device 104 of FIG. 1. However, the process 900 is not limited to the electronic device 104 of FIG. 1, and one or more blocks (or operations) of the process 900 may be performed by one or more other components and/or other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, at a computing device (e.g., electronic device 104) including a first process (e.g., a sandboxed process or another process, such as an application-specific process in sandbox 300), a second process (e.g., an application or another process), and a memory manager (e.g., memory manager 700), the first process may identify data to be processed by the second process. The first process may identify the data to be processed by receiving the data, by receiving a call from the second process indicating that the data is available, or by receiving a message or other event from another process (e.g., a system process) that the data is available (as examples). The data to be processed may include network data received over a network, such as image data, and/or may be another type of data received by or stored at the device, such as JavaScript Object Notation (JSON) data, property list (plist) data, other types of data, and/or typeless data. In one or more implementations, the first process may include either or both of the filter process 502 and the filter process 506 of FIG. 5. In one or more implementations, identifying, by the first process, the data to be processed by the second process may include receiving an initial request at the first process from the second process for size information corresponding to the data.

In one or more implementations, prior to identifying, by the first process at the computing device, the data to be processed by the second process, the computing device may receive the data (e.g., in a message received via a messaging application, such as a messaging application corresponding to the second process). The first process and the second process may each be separate from the memory manager. For example, the first process may be a compute-only sandboxed process (e.g., sandbox 300). The second process (e.g., application 200) may have access to a system resource (e.g., any or all of system resources 202, such as memory manager 700 and/or other system software and/or hardware resources) that is inaccessible by the compute-only sandboxed process.

At block 904, the first process may transmit, to the second process, a request for allocation of memory. For example, the first process may transmit a memory request to the second process, as described herein in connection with FIG. 7. In one or more implementations, the first process may transmit the memory request responsive to a determination (e.g., by the first process) that another memory region (e.g., memory region 703) for the first process is insufficient for processing of the data. In one or more implementations, transmitting the memory request may include providing a size of the data or other size information indicating memory requirements associated with the data, to the second process, responsive to an initial request from the first process for the size or other size information indicating the memory requirements associated with the data.

At block 906, the first process may receive, from the second process, an identifier (e.g., a region identifier) corresponding to a memory region (e.g., memory region 704). For example, the second process may provide an allocation request to the memory manager, receive an identifier (e.g., a descriptor such as a file descriptor for a file port) from the memory manager, link the identifier to the memory region, and provide a region identifier to the first process. Because the memory region is allocated for the second process, the memory manager may account the memory region to the second process (e.g., and not to the first process).

In one or more implementations, the identifier may be a descriptor that is generated by the memory manager (e.g., memory manager 700). For example, the descriptor may be generated by the memory manager based on the request (e.g., an allocation request) from the second process, the request including a request to provide access to the descriptor for the first process. In one or more implementations, the region identifier provided to the first process may include a port identifier and/or a uniform resource locator for the memory region.

At block 908, the first process may perform a first processing of the data. In one or more implementations, the region identifier provided to the first process from the second process at block 906 may be provided in a call from the second process to the first process to perform the first processing of the data. For example, the first processing of the data by the first process may include repeatedly reading a portion of the data (e.g., from the allocated memory region), processing the portion of the data (e.g., in the allocated memory region), and writing the processed portion of the data (e.g., first processed data as described herein in connection with FIG. 8) to the memory region using the identifier. For example, the first process may perform the first processing in the allocated memory region.

In one or more implementations, the first processing of the data with the first process may include decoding or transcoding the data (e.g., as described herein in connection with FIGS. 3, 4, 5, and/or 6). For example, the first process may include transcoding the data by transcoding the data from a format in which the data is received to a data format associated with the second process. For example, the second process may specify the data format in a call to the first process for the first processing.

In one or more implementations, transcoding the data includes removing a portion of the data. For example, the data may include image data (e.g., jpeg data or image data in any other image format), and removing a portion of the data may include removing an unused bit from the data for each pixel of the image data. For example, each pixel of a jpeg file may include four bits, three of which include image information, and one of which is unused. In one or more operational scenarios, malicious data can be encoded into the unused bit of various pixels of the jpeg data. Removing the unused bits by the first process (e.g., within the sandbox 300 in one or more implementations) may prevent malicious or other harmful content in the unused bits from affecting the second process and/or other processes at the computing device. For example, in implementations in which the first process is a sandboxed process, the removed malicious data may be harmlessly removed or may cause the first process to fail, either way preventing the malicious data from affecting other portions or processes of the computing device (e.g., as described herein in connection with FIGS. 3-6).

In one or more implementations in which the first process includes a transcoding process, the first process may also include performing an initial verification that the data is valid (e.g., by providing type data or other metadata for the data to schema validation 302) prior to performing the transcoding. In one or more implementations, the data includes image data and the second process corresponds to an image analysis process. In one or more implementations, the second process (e.g., the image analysis process) may be or may include a machine-learning process, such as an image analysis process (e.g., an object recognition process, a filtering process, a facial recognition process, etc.).

At block 910, the first process may write an output of the first processing (e.g., first processed data) to the memory region using the identifier. For example, the output of the first processing may include a decoded or transcoded version of the data. In one or more implementations, the output of the first processing may be processed through a schema validation (e.g., schema validation 302) prior to writing the output to the memory region and/or prior to access of the output by the second process.

In one or more implementations, the second processing of the output of the first processing in the allocated memory region by the second process may include processing each processed portion of the data as it is received in the memory region from the first process. In other operational scenarios, the second processing may be performed after all of the processed portions of the data are received in the memory region from the first process. In one or more implementations, the second process recalls the processed data from the memory region and performs the second processing of the processed data.

Figure 10:
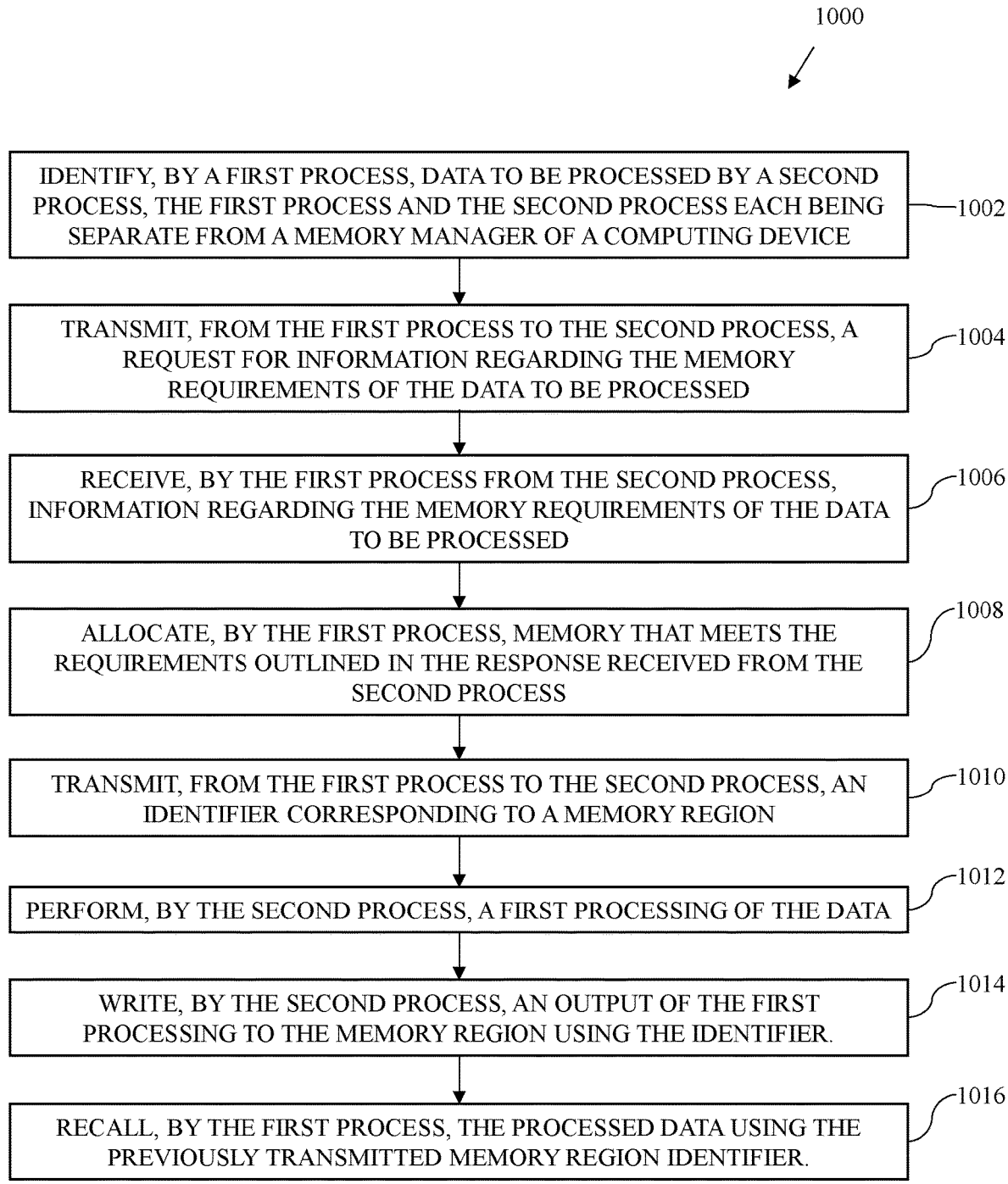
FIG. 10 illustrates a flow diagram of example operations that can be performed for allocation of memory by one process for processing of data by another process in accordance with one or more implementations.

FIG. 10 illustrates a flow diagram of an example process 1000 for facilitating processing of data in memory of one process at a device by another process at the device, in accordance with one or more implementations. For explanatory purposes, the process 1000 is primarily described herein with reference to the electronic device 104 of FIG. 1. However, the process 1000 is not limited to the electronic device 104 of FIG. 1, and one or more blocks (or operations) of the process 1000 may be performed by one or more other components and/or other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, a first process (e.g., application 200 or another process such as a client process) identifies data to be processed by a second process (e.g., a sandboxed process or another process, such as an application-specific process in sandbox 300), the first process and the second process each being separate from a memory manager (e.g., memory manager 700) of a computing device (e.g., electronic device 104). For clarity, it is appreciated that, in some examples, the terms "first process" and "second process" in the description of FIG. 10 may correspond to aspects of the respective "second process" and "first process" in the description of FIG. 9.

At block 1004, the first process may transmit to the second process, a request for information regarding the memory requirements of the data to be processed. For example, in one or more implementations, the first process may be a client process that makes an initial request to the second process for a size of the data to be processed.

At block 1006, the first process may receive, from the second process, the information regarding the memory requirements of the data to be processed. For example, the second process may determine the size of the data and transmit the size of the data to the first process.

At block 1008, the first process may allocate memory (e.g., memory 704) that meets the requirements outlined in the response received from the second process (e.g., memory having sufficient size to store and/or process the data). For example, the first process may provide an allocation request to the memory manager, receive an identifier (e.g., a descriptor such as a file descriptor for a file port) from the memory manager, link the identifier to the memory region, and provide a region identifier to the second process (e.g., as described above in connection with FIGS. 7-9). Because the memory region is allocated for the first process, the memory manager may account the memory region to the first process (e.g., and not to the second process).

At block 1010, the first process may transmit, to the second process, an identifier (e.g., a region identifier) corresponding to a memory region.

At block 1012, the second process may perform a first processing of the data. For example, in one or more implementations, the first processing of the data with the second process may include decoding or transcoding the data (e.g., as described herein in connection with FIGS. 3, 4, 5, 6, and/or 9). For example, the first processing of the data may include transcoding the data by transcoding the data from a format in which the data is received to a data format associated with the second process. For example, the first process may specify the data format in a call to the second process for the first processing.

At block 1014, the second process may write an output of the first processing to the memory region using the identifier. For example, the output of the first processing may include a decoded or transcoded version of the data. In one or more implementations, the output of the second processing may be processed through a schema validation (e.g., schema validation 302) prior to writing the output to the memory region by the second process, and/or prior to access of the output by the first process.

At block 1016, the first process may recall the processed data using the previously transmitted memory region identifier. The first process may then perform a second processing of the recalled processed data.

Figure 11:
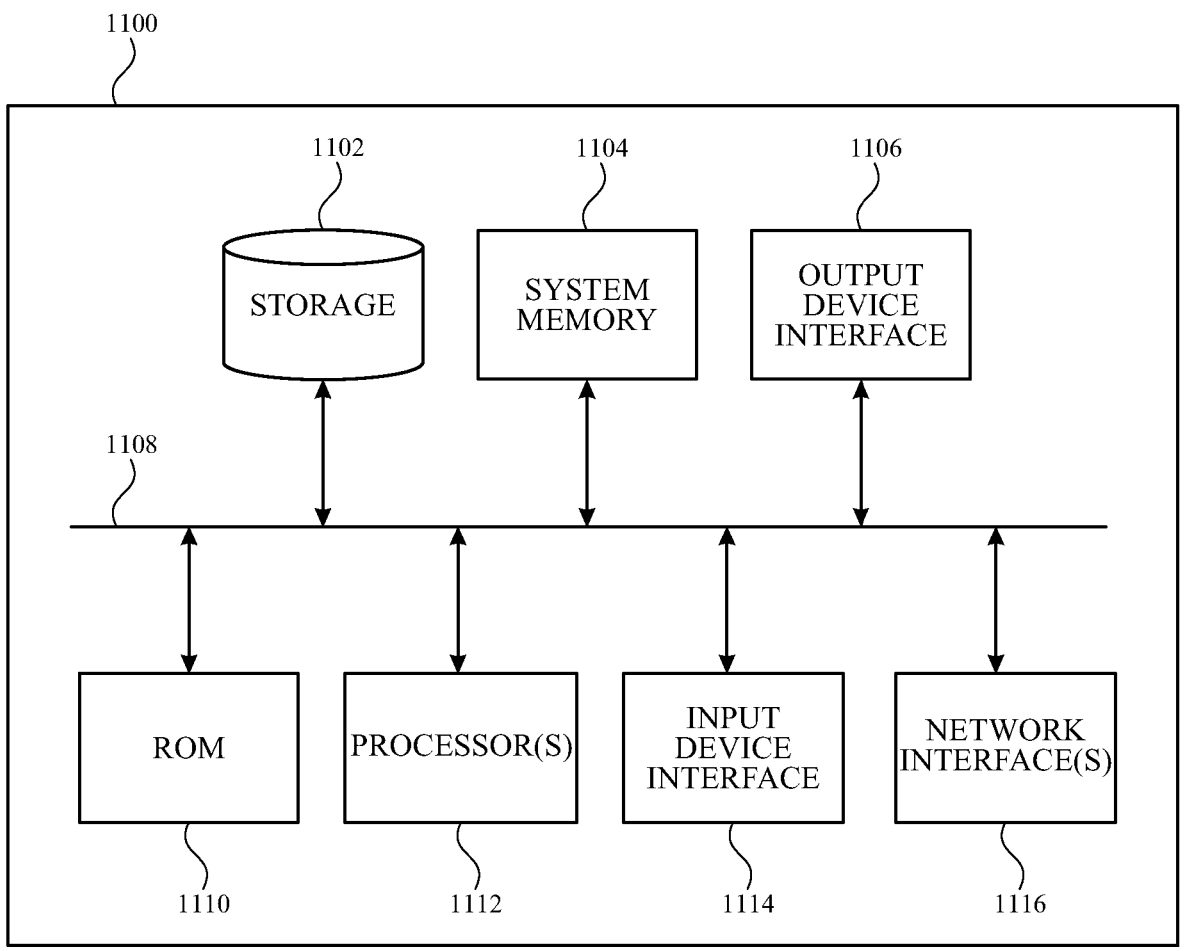
FIG. 11 illustrates an example electronic system with which aspects of the subject technology may be implemented in accordance with one or more implementations.

FIG. 11 illustrates an electronic system 1100 with which one or more implementations of the subject technology may be implemented. The electronic system 1100 can be, and/or can be a part of, one or more of the electronic devices 102 or 104, the servers 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the servers 120 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

In accordance with aspects of the disclosure, a method is provided that includes receiving, at a device having an application, a message that includes information associated with an object having an object type. The application is configured to process the message to provide message content including the object to a user interface. The method further includes performing application-specific operations for the application, on the message, in a sandbox that is separate from the application. The application-specific operations include: determining the object type; and attempting to generate the object from the information associated with the object in the message, based on the determined object type. The method also includes, in accordance with a completion of the attempt to generate the object in the sandbox, performing, outside of the sandbox and outside of the application, a schema validation of the object based on the object type.

In accordance with aspects of the disclosure, a non-transitory machine-readable medium is provided storing instructions that, when executed by one or more processors, cause the one or more processors to perform operations that include receiving, at a device having an application, a message that includes information associated with an object having an object type. The application is configured to process the message to provide message content including the object to a user interface. The operations also include performing application-specific operations for the application, on the message, in a sandbox that is separate from the application. The application-specific operations include: determining the object type; and attempting to generate the object from the information associated with the object in the message, based on the determined object type. The operations also include, in accordance with a completion of the attempt to generate the object in the sandbox (e.g., if the object is successfully generated), performing, outside of the sandbox and outside of the application, a schema validation of the object based on the object type.

In accordance with aspects of the disclosure, an electronic device is provided that includes memory storing an application, and one or more processors, where the one or more processors are configured to receive a message that includes information associated with an object having an object type. The application is configured to process the message to provide message content including the object to a user interface. The one or more processors are further configured to perform application-specific operations for the application, on the message, in a sandbox that is separate from the application. The application-specific operations include: determining the object type; and attempting to generate the object from the information associated with the object in the message, based on the determined object type. The one or more processors are further configured to, in accordance with a completion of the attempt to generate the object in the sandbox, perform, outside of the sandbox and outside of the application, a schema validation of the object based on the object type.

In accordance with aspects of the disclosure, a method is provided that includes, at a computing device including a first process, a second process, and a memory manager: identifying, by the first process, data to be processed by the second process, the first process and the second process each being separate from the memory manager; transmitting, from the first process to the second process, a request for allocation of memory; receiving, by the first process from the second process, an identifier corresponding to a memory region; performing, by the first process, a first processing of the data; and writing an output of the first processing to the memory region using the identifier.

In accordance with aspects of the disclosure, an electronic device is provided that includes a first process; a second process; a memory manager, the first process and the second process each being separate from the memory manager; and one or more processors configured to: identify, by the first process, data to be processed by the second process; transmit, from the first process to the second process, a request for allocation of memory; receive, by the first process from the second process, an identifier corresponding to a memory region; perform, by the first process, a first processing of the data; and write an output of the first processing to the memory region using the identifier.

In accordance with aspects of the disclosure, a non-transitory machine-readable medium is provided storing instructions that, when executed by one or more processors, cause the one or more processors to perform operations that include at a computing device including a first process, a second process, and a memory manager: identifying, by the first process, data to be processed by the second process, the first process and the second process each being separate from the memory manager; transmitting, from the first process to the second process, a request for allocation of memory; receiving, by the first process from the second process, an identifier corresponding to a memory region; performing, by the first process, a first processing of the data; and writing an output of the first processing to the memory region using the identifier.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, at a device having an application, a message that includes information associated with an object having an object type, wherein the application is configured to process the message to provide message content including the object to a user interface;
   performing application-specific operations for the application, on the message, in a sandbox that is separate from the application, wherein the application-specific operations include:
   determining the object type; and
   attempting to generate the object from the information associated with the object in the message, based on the determined object type; and
   in accordance with a completion of the attempt to generate the object in the sandbox, performing, outside of the sandbox and outside of the application, a schema validation of the object based on the object type.

2. The method of claim 1, wherein performing the schema validation comprises performing the schema validation in an additional sandbox that is separate from the sandbox and from the application.

3. The method of claim 1, further comprising, in accordance with a successful schema validation of the object generated in the sandbox, providing a corresponding validated object to the application, wherein the successful schema validation indicates that the object conforms to a schema for the object type.

4. The method of claim 1, further comprising, in accordance with an incomplete attempt to generate the object in the sandbox:
   preventing data associated with the object from being provided to the schema validation or to the application.

5. The method of claim 4, further comprising:
   generating, within the sandbox, another object from the message;
   performing another schema validation for the other object, outside the sandbox and outside the application, based on another object type for the other object; and
   providing a validated object corresponding to the other object to the application in accordance with a successful schema validation of the other object.

6. The method of claim 1, further comprising, in accordance with a total failure of the application-specific operations in the sandbox:

preventing delivery of the message to the application; and
sending, to a remote device, a failure notification.

7. The method of claim 1, further comprising:
determining, based on the schema validation of the object, that the object does not conform to an expected schema for the object type; and
preventing the object from being provided to the application responsive to the determination that the object does not conform to a schema for the object type.

8. The method of claim 1, wherein the sandbox comprises a compute-only sandbox.

9. The method of claim 1, wherein the message is an encrypted message, the method further comprising:
decrypting the message, in an additional sandbox that is separate from the sandbox and from the application, to obtain unencrypted message data including the information associated with the object.

10. A non-transitory machine-readable medium storing instructions that, when executed by one or more processors, cause the one or more processors to perform operations that include:
receiving, at a device having an application, a message that includes information associated with an object having an object type, wherein the application is configured to process the message to provide message content including the object to a user interface;
performing application-specific operations for the application, on the message, in a sandbox that is separate from the application, wherein the application-specific operations include:
determining the object type; and
attempting to generate the object from the information associated with the object in the message, based on the determined object type; and
in accordance with a completion of the attempt to generate the object in the sandbox, performing, outside of the sandbox and outside of the application, a schema validation of the object based on the object type.

11. The non-transitory machine-readable medium of claim 10, wherein performing the schema validation comprises performing the schema validation in an additional sandbox that is separate from the sandbox and from the application.

12. The non-transitory machine-readable medium of claim 10, the operations further comprising, in accordance with a successful schema validation of the object generated in the sandbox, providing a corresponding validated object to the application, wherein the successful schema validation indicates that the object conforms to a schema for the object type.

13. The non-transitory machine-readable medium of claim 10, the operations further comprising, in accordance with an incomplete attempt to generate the object in the sandbox:
preventing data associated with the object from being provided to the schema validation or to the application.

14. The non-transitory machine-readable medium of claim 13, the operations further comprising:
generating, within the sandbox, another object from the message;
performing another schema validation for the other object, outside the sandbox and outside the application, based on another object type for the other object; and
providing a validated object corresponding to the other object to the application in accordance with a successful schema validation of the other object.

15. The non-transitory machine-readable medium of claim 10, the operations further comprising:
determining, based on the schema validation of the object, that the object does not conform to an expected schema for the object type; and
preventing the object from being provided to the application responsive to the determination that the object does not conform to a schema for the object type.

16. An electronic device, comprising:
memory storing an application; and
one or more processors, wherein the one or more processors are configured to:
receive a message that includes information associated with an object having an object type, wherein the application is configured to process the message to provide message content including the object to a user interface;
perform application-specific operations for the application, on the message, in a sandbox that is separate from the application, wherein the application-specific operations include:
determining the object type; and
attempting to generate the object from the information associated with the object in the message, based on the determined object type; and
in accordance with a completion of the attempt to generate the object in the sandbox, perform, outside of the sandbox and outside of the application, a schema validation of the object based on the object type.

17. The electronic device of claim 16, wherein the one or more processors are further configured to, in accordance with a total failure of the application-specific operations in the sandbox:
prevent delivery of the message to the application; and
send, to a remote device, a failure notification.

18. The electronic device of claim 16, wherein the one or more processors are further configured to:
determine, based on the schema validation of the object, that the object does not conform to an expected schema for the object type; and
prevent the object from being provided to the application responsive to the determination that the object does not conform to a schema for the object type.

19. The electronic device of claim 16, wherein the sandbox comprises a compute-only sandbox.

20. The electronic device of claim 16, wherein the message is an encrypted message, wherein the one or more processors are further configured to:
decrypt the message, in an additional sandbox that is separate from the sandbox and from the application, to obtain unencrypted message data including the information associated with the object.

21. A method, comprising:
receiving, at a device having an application, a message that includes information associated with an image having an image type, wherein the application is configured to process the message to provide message content including the image to a user interface;
performing application-specific operations for the application, on the message, in a sandbox that is separate from the application, wherein the application-specific operations include:
determining the image type; and
attempting to generate the image from the information associated with the image in the message, based on the determined image type; and in accordance with a completion of the attempt to generate the image in the sandbox, performing, outside of the sandbox and outside of the application, a schema validation of the image based on the image type, wherein attempting to generate the image comprises:
identifying, within the sandbox, the image to be processed by the application;
transmitting, from a first process corresponding to the sandbox to a second process corresponding to the application, a request for allocation of memory;
receiving, by the first process from the second process, an identifier corresponding to a memory region;
performing, by the first process, a first processing to generate the image data; and
writing an output of the first processing to the memory region using the identifier.

22. The method of claim 21, wherein the first process is a compute-only sandboxed process, and the second process has access to a system resource that is inaccessible by the sandboxed compute-only process.

23. The method of claim 21, wherein the identifier is a descriptor that is generated by a memory manager that is separate from the application and the sandbox.

24. The method of claim 23, wherein the descriptor is generated by the memory manager based on a request from the second process, the request including a request to provide access to the descriptor for the first process.

25. The method of claim 23, wherein the memory manager accounts the memory region to the second process.

26. The method of claim 21, wherein the first processing includes repeatedly reading a portion of the image, processing the portion of the image, and writing the processed portion of the image to the memory region using the identifier.

27. The method of claim 26, further comprising performing a second processing of the output of the first processing in the memory region by the second process, wherein the second processing includes processing each processed portion of the image as it is received in the memory region from the first process.

28. The method of claim 21, wherein the first processing of the image with the first process includes decoding or transcoding the image.

29. The method of claim 21, wherein the application comprises a messaging application.

30. An electronic device, comprising:
a first process corresponding to a sandbox;
a second process corresponding to an application;
a memory manager, the first process and the second process each being separate from the memory manager; and
one or more processors configured to:
receive a message that includes information associated with an image having an image type, wherein the application is configured to process the message to provide message content including the image to a user interface;
perform application-specific operations for the application, on the message, in the sandbox, the sandbox being separate from the application, wherein the application-specific operations include:
determining the image type; and
attempting to generate the image from the information associated with the image in the message, based on the determined image type; and
in accordance with a completion of the attempt to generate the image in the sandbox, performing, outside of the sandbox and outside of the application, a schema validation of the image based on the image type, wherein the one or more processors are configured to attempt to generate the image comprises by performing operations to:
identify, within the sandbox, the image to be processed by the application;
transmit, from the first process to the second process, a request for allocation of memory;
receive, by the first process from the second process, an identifier corresponding to a memory region;
perform, by the first process, a first processing to generate the image; and
write an output of the first processing to the memory region using the identifier.

31. The electronic device of claim 30, wherein the first process is a compute-only sandboxed process, and wherein the electronic device further comprises a system resource that is inaccessible by the sandboxed compute-only process and accessible to the second process.

32. The electronic device of claim 30, wherein the identifier is a descriptor that is generated by the memory manager.

33. The electronic device of claim 32, wherein the descriptor is generated by the memory manager based on a request from the second process, the request including a request to provide access to the descriptor for the first process.

34. The electronic device of claim 33, wherein the memory manager accounts the memory region to the second process.

35. The electronic device of claim 30, wherein the first processing of the image by the first process includes repeatedly reading a portion of the image, processing the portion of the image, and writing the processed portion of the image to the memory region using the identifier.

36. The electronic device of claim 35, wherein a second processing of the output of the first processing in the memory region by the second process includes processing each processed portion of the image as it is received in the memory region from the first process.

37. A non-transitory machine-readable medium storing instructions that, when executed by one or more processors, cause the one or more processors to perform operations that include:
at a computing device including a first process corresponding to a sandbox, a second process corresponding to an application, and a memory manager:
receiving a message that includes information associated with an image having an image type, wherein the application is configured to process the message to provide message content including the image to a user interface;
performing application-specific operations for the application, on the message, in the sandbox, the sandbox being separate from the application, wherein the application-specific operations include:
determining the image type; and
attempting to generate the image from the information associated with the image in the message, based on the determined image type; and
in accordance with a completion of the attempt to generate the image in the sandbox, performing, outside of the sandbox and outside of the application, a schema validation of the image based on the image type, wherein attempting to generate the image comprises:

identifying, within the sandbox, the image to be processed by the second process, the first process and the second process each being separate from the memory manager;

transmitting, from the first process to the second process, a request for allocation of memory;

receiving, by the first process from the second process, an identifier corresponding to a memory region;

performing, by the first process, a first processing to generate the image; and writing an output of the first processing to the memory region using the identifier.

38. The non-transitory machine-readable medium of claim 37, wherein the first processing of the image with the first process includes decoding or transcoding the image.

39. The non-transitory machine-readable medium of claim 37, wherein the application comprises a messaging application.

40. The non-transitory machine-readable medium of claim 37, wherein the first process is a compute-only sandboxed process, and wherein the computing device further comprises a system resource that is inaccessible by the sandboxed compute-only process and accessible to the seccond process.

41. The non-transitory machine-readable medium of claim 37, wherein:

identifying, by the first process, the image to be processed by the second process comprises receiving an initial request at the first process from the second process for size information corresponding to the image; and transmitting, from the first process to the second process, the request for allocation of the memory comprises transmitting the size information corresponding to the image from the first process to the second process, responsive to the initial request.

* * * * *